(12) United States Patent
Kim et al.

(10) Patent No.: US 11,750,246 B2
(45) Date of Patent: Sep. 5, 2023

(54) MAGNETIC FIELD COMMUNICATION METHOD AND APPARATUS USING GMI MAGNETOMETER

(71) Applicants: ELECTRONICS AND TELECOMMUNICATIONS RESEARCH INSTITUTE, Daejeon (KR); Korea Advanced Institute of Science and Technology, Daejeon (KR)

(72) Inventors: Jang Yeol Kim, Daejeon (KR); Jaewoo Lee, Daejeon (KR); Hyunjoon Lee, Daejeon (KR); In Kui Cho, Daejeon (KR); Sang-Won Kim, Daejeon (KR); Seong-Min Kim, Daejeon (KR); Jung Ick Moon, Daejeon (KR); Je Hoon Yun, Daejeon (KR); Dong Won Jang, Daejeon (KR); Seunghun Ryu, Daejeon (KR); Seungyoung Ahn, Daejeon (KR)

(73) Assignees: ELECTRONICS AND TELECOMMUNICATIONS RESEARCH INSTITUTE, Daejeon (KR); Korea Advanced Institute of Science and Technology, Daejeon (KR)

( * ) Notice: Subject to any disclaimer, the term of this patent is extended or adjusted under 35 U.S.C. 154(b) by 74 days.

(21) Appl. No.: 17/553,466

(22) Filed: Dec. 16, 2021

(65) Prior Publication Data

US 2022/0200662 A1 Jun. 23, 2022

(30) Foreign Application Priority Data

Dec. 17, 2020 (KR) .................. 10-2020-0177231

(51) Int. Cl.
*H04B 5/00* (2006.01)
*H03K 9/00* (2006.01)
(Continued)

(52) U.S. Cl.
CPC .................. *H04B 5/0075* (2013.01)

(58) Field of Classification Search
None
See application file for complete search history.

(56) References Cited

U.S. PATENT DOCUMENTS

| 5,608,320 A | * | 3/1997 | Dinsmore | G01R 33/04 |
| | | | | 324/253 |
| 6,566,872 B1 | * | 5/2003 | Sugitani | G01R 33/02 |
| | | | | 324/249 |

(Continued)

FOREIGN PATENT DOCUMENTS

| KR | 1020070032271 A | 3/2007 |
| KR | 1020120134507 A | 12/2012 |

OTHER PUBLICATIONS

Basile Dufay et al., "Impact of Electronic Conditioning on the Noise Performance of a Two-Port Network Giant MagnetoImpedance Magnetometer", IEEE Sensors Journal, Institute of Electrical and Electronics Engineers, Nov. 2010, pp. 1317-1324.

(Continued)

*Primary Examiner* — Tuan A Tran

(57) ABSTRACT

A magnetic field communication method and apparatus using a giant magnetoimpedance (GMI) magnetometer are disclosed. The magnetic field communication apparatus includes a GMI magnetometer configured to detect a first communication signal based on a received magnetic field signal, a first signal extractor configured to extract a second communication signal comprising a message signal from the first communication signal, a second signal extractor configured to extract a third communication signal by removing a magnetization frequency signal from the second communication signal, and a third signal extractor configured to (Continued)

extract the message signal by removing a carrier wave frequency signal from the third communication signal.

17 Claims, 5 Drawing Sheets

(51) Int. Cl.
*H03D 3/24* (2006.01)
*G01R 33/00* (2006.01)
*G01R 33/028* (2006.01)

(56) References Cited

U.S. PATENT DOCUMENTS

| | | | | |
|---|---|---|---|---|
| 6,842,637 | B2* | 1/2005 | Tsukada | G01R 33/0206 |
| | | | | 600/407 |
| 6,909,368 | B2* | 6/2005 | Sumi | G01R 33/02 |
| | | | | 340/552 |
| 7,079,591 | B2* | 7/2006 | Fling | G01V 3/08 |
| | | | | 375/376 |
| 7,193,413 | B2* | 3/2007 | Kandori | G01R 33/0354 |
| | | | | 324/244 |
| 7,425,821 | B2* | 9/2008 | Monreal | G01R 33/07 |
| | | | | 324/117 H |
| 7,525,413 | B2 | 4/2009 | Jung et al. | |
| 9,189,724 | B2* | 11/2015 | Morita | H04B 1/40 |
| 9,331,886 | B2* | 5/2016 | Harwell | H04L 27/38 |
| 9,453,890 | B2* | 9/2016 | Yamashita | G01R 33/096 |
| 9,476,951 | B2* | 10/2016 | Orozco | G01R 33/035 |
| 9,559,833 | B1* | 1/2017 | Xu | H04W 56/0035 |
| 9,577,337 | B2 | 2/2017 | Jung et al. | |
| 9,716,453 | B2* | 7/2017 | Guo | G01D 5/145 |
| 9,891,290 | B2* | 2/2018 | Horsley | G01R 33/0041 |
| 10,135,496 | B2* | 11/2018 | Long | H04B 5/0031 |
| 10,175,307 | B1* | 1/2019 | Sorenson | G01R 33/0286 |
| 10,298,295 | B2* | 5/2019 | Tramoni | G06K 7/10128 |
| 10,318,953 | B2* | 6/2019 | Binder | H04B 5/0031 |
| 10,333,588 | B2* | 6/2019 | Russo | H04B 5/0081 |
| 10,826,565 | B2* | 11/2020 | Daga | H04B 5/0037 |
| 11,121,740 | B2* | 9/2021 | Daga | H04B 5/0031 |
| 11,163,022 | B2* | 11/2021 | Daubert | G01R 33/077 |
| 11,169,224 | B2* | 11/2021 | Makino | G01R 33/09 |
| 11,249,152 | B2* | 2/2022 | Makino | G01R 33/0041 |
| 11,269,023 | B2* | 3/2022 | Kiyono | G01R 33/0041 |
| 11,287,489 | B2* | 3/2022 | Daubert | G01R 33/096 |
| 2003/0078004 | A1* | 4/2003 | Vester | G01R 33/3692 |
| | | | | 455/42 |
| 2017/0207823 | A1 | 7/2017 | Russo et al. | |

OTHER PUBLICATIONS

Basile Dufay et al., "Development of a High Sensitivity Giant Magneto-Impedance Magnetometer: Comparison With a Commercial Flux-Gate", IEEE Transactions on Magnetics, Institute of Electrical and Electronics Engineers, 2013, 49 (1), pp. 85-88.

Basile Dufay et al., "Characterization of an optimized off-diagonal GMI-based magnetometer", IEEE Sensors Journal, Institute of Electrical and Electronics Engineers, 2013, 13 (1), pp. 379-388.

Basile Dufay et al., "Physical Properties and Giant Magnetoimpedance Sensitivity of Rapidly Solidified Magnetic Microwires", Journal of Magnetism and Magnetic Materials 2012, 324(13), pp. 2091-2099, Elsevier.

Kaneo Mohri et al. "Recent Advances of Amorphous Wire CMOS IC Magneto-Impedance Sensors: Innovative High-Performance Micromagnetic Sensor Chip", 2015, Hindawi Publishing Corporation.

Seok Soo Yoon et al., "Development of Magnetoimpedance Sensor Utilizing Soft Magnetic Amorphous Ribbon with Exchange Coupling and Application to Nondestructive Testing", Journal of the Korean Society for Nondestructive Testing vol. 28, No. 5, Oct. 2008, pp. 401-405.

* cited by examiner

MAGNETIC FIELD COMMUNICATION METHOD AND APPARATUS USING GMI MAGNETOMETER

CROSS-REFERENCE TO RELATED APPLICATION

This application claims the benefit of Korean Patent Application No. 10-2020-0177231 filed on Dec. 17, 2020, in the Korean Intellectual Property Office, the entire disclosure of which is incorporated herein by reference for all purposes.

BACKGROUND

1. Field of the Invention

One or more example embodiments relate to a magnetic field communication method and apparatus using a giant magnetoimpedance (GMI) magnetometer.

2. Description of the Related Art

Magnetic field communication is a near-field magnetic induction technology that is used at a maximum distance of 10 centimeters (cm) for payment, logistics management, and entry/exit monitoring.

In theory, a giant magnetoimpedance (GMI) magnetometer may detect a weak magnetic field due to its high sensitivity at a picotesla level and be applied to high-sensitivity magnetic field sensing-based wireless communication technology. When a GMI magnetometer is used as a receiving device in magnetic field communication, a weak magnetic field may be detected by the GMI magnetometer with high sensitivity, and a transmission distance that is a physical limit of an existing magnetic field transmission technology may be extended.

The above description is information the inventor(s) acquired during the course of conceiving the present disclosure, or already possessed at the time, and is not necessarily art publicly known before the present application was filed.

SUMMARY

Example embodiments provide a magnetic field communication technology using a giant magnetoimpedance (GMI) magnetometer as a receiving device.

However, technical tasks to be achieved by the present disclosure are not limited to the above-described technical tasks, and other technical tasks may exist.

According to an aspect, there is provided a magnetic field communication apparatus including a giant magnetoimpedance (GMI) magnetometer configured to detect a first communication signal based on a received magnetic field signal, a first signal extractor configured to extract a second communication signal comprising a message signal from the first communication signal, a second signal extractor configured to extract a third communication signal by removing a magnetization frequency signal from the second communication signal, and a third signal extractor configured to extract the message signal by removing a carrier wave frequency signal from the third communication signal.

The first communication signal may include the magnetization frequency signal and a signal in which the magnetization frequency signal, the carrier wave frequency signal, and the message signal are combined.

The second signal extractor may include a mixer configured to remove the magnetization frequency signal using a local oscillator (LO) signal having a same frequency as the magnetization frequency signal.

The second signal extractor may further include a low-pass filter configured to remove a harmonic component of the third communication signal, and an amplifier configured to amplify the third communication signal.

The third signal extractor may include a mixer configured to remove the carrier wave frequency signal using an LO signal having a same frequency as the carrier wave frequency signal.

The third signal extractor may further include a low-pass filter configured to remove a harmonic component of the message signal, and an amplifier configured to amplify the message signal.

The magnetic field communication apparatus may further include a signal generator configured to provide a comparison signal among at least one of the GMI magnetometer, the second signal extractor, and the third signal extractor.

The magnetic field communication apparatus may further include a data acquisition device configured to convert the message signal into a digital signal and collect the digital signal.

According to another aspect, there is provided a magnetic field communication method including detecting a first communication signal based on a received magnetic field signal, extracting a second communication signal comprising a message signal from the first communication signal, extracting a third communication signal by removing a magnetization frequency signal from the second communication signal, and extracting the message signal by removing a carrier wave frequency signal from the third communication signal.

The first communication signal may include the magnetization frequency signal and a signal in which the magnetization frequency signal, the carrier wave frequency signal, and the message signal are combined.

The extracting of the third communication signal may include removing the magnetization frequency signal using a local oscillator (LO) signal having a same frequency as the magnetization frequency signal.

The extracting of the third communication signal may further include removing a harmonic component of the third communication signal, and amplifying the third communication signal.

The extracting of the message signal may include removing the carrier wave frequency signal using an LO signal having a same frequency as the carrier wave frequency signal.

The extracting of the message signal may further include removing a harmonic component of the message signal, and amplifying the message signal.

The magnetic field communication method may further include converting the message signal into a digital signal, and collecting the digital signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
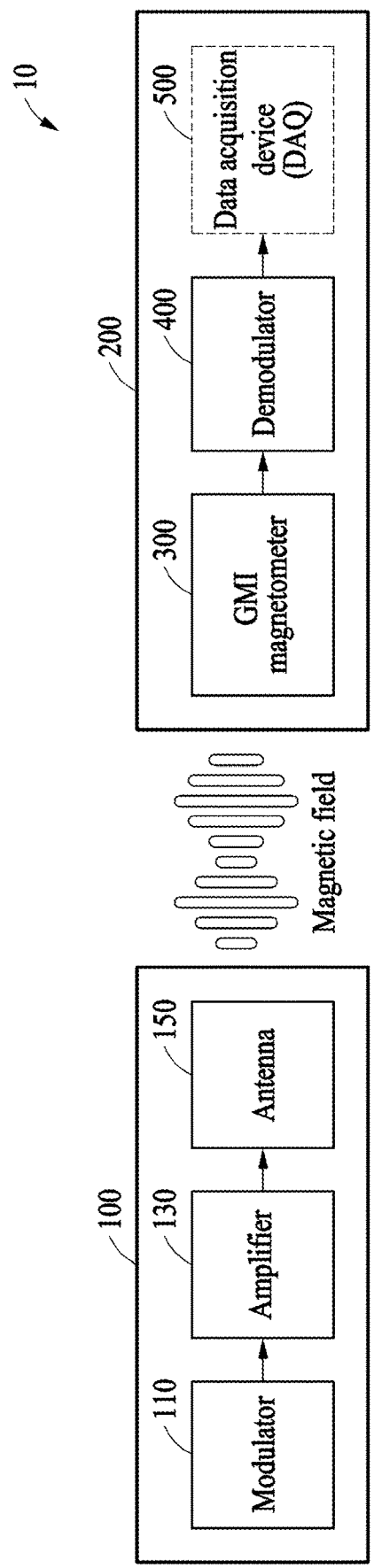
FIG. 1 is a diagram illustrating an example of a magnetic field communication system according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an example of a magnetic field communication system according to an example embodiment.

A magnetic field communication system 10 may perform a magnetic field communication using a giant magneto-impedance (GMI) magnetometer as a receiving device. The magnetic field communication system 10 may perform wireless communication at a transmission distance of tens or hundreds of meters in an extreme environment (e.g., underground or underwater) using the GMI magnetometer as the receiving device.

The magnetic field communication system 10 may include a magnetic field communication apparatus 100 for transmitting a magnetic field signal and a magnetic field communication apparatus 200 for receiving the magnetic field signal. Hereinafter, for the convenience of description, the magnetic field communication apparatus 100 for transmitting a magnetic field signal will be referred to as a transmitter 100, and the magnetic field communication apparatus 200 for receiving the magnetic field signal will be referred to as a receiver 200.

The transmitter 100 may transmit a signal in which a message signal and a carrier wave frequency signal are modulated with the magnetic field signal. The transmitter 100 may include a modulator 110, an amplifier 130, and an antenna 150.

The modulator 110 may generate a modulation signal for communication. The modulation signal may be an analog modulation signal including the carrier wave frequency signal and the message signal. The modulation signal may be a frequency shift keying (FSK) signal of a sine wave, a phase shift keying (PSK) signal of a sine wave, or an amplitude shift keying (ASK) signal of a sine wave.

A modulator 110 may insert and encode a terminator for identifying the message signal in the modulation signal. For example, the modulator 110 may perform encoding with a Manchester code.

The modulator 110 may include a signal generator including an oscillator and a controller that controls the modulator 110. The controller may select a modulation method (e.g., an FSK method, a PSK method, an ASK method), set an amplitude, set a carrier wave frequency, set a duty time, set a message signal and/or set transmission settings, and the like.

The amplifier 130 may amplify the modulation signal, and the antenna 150 may transmit the amplified modulation signal as the magnetic field signal.

The receiver 200 may include a GMI magnetometer 300 and a demodulator 400. The receiver 200 may further include a data acquisition device 500.

The GMI magnetometer 300 may detect the magnetic field signal. The GMI magnetometer 300 may receive the analog modulation signal transmitted from the transmitter 100 and transmit it to the demodulator 400.

The demodulator 400 may extract the message signal from the modulation signal. The extracted message signal may be converted into a digital signal and stored in the data acquisition device 500.

Figure 2:
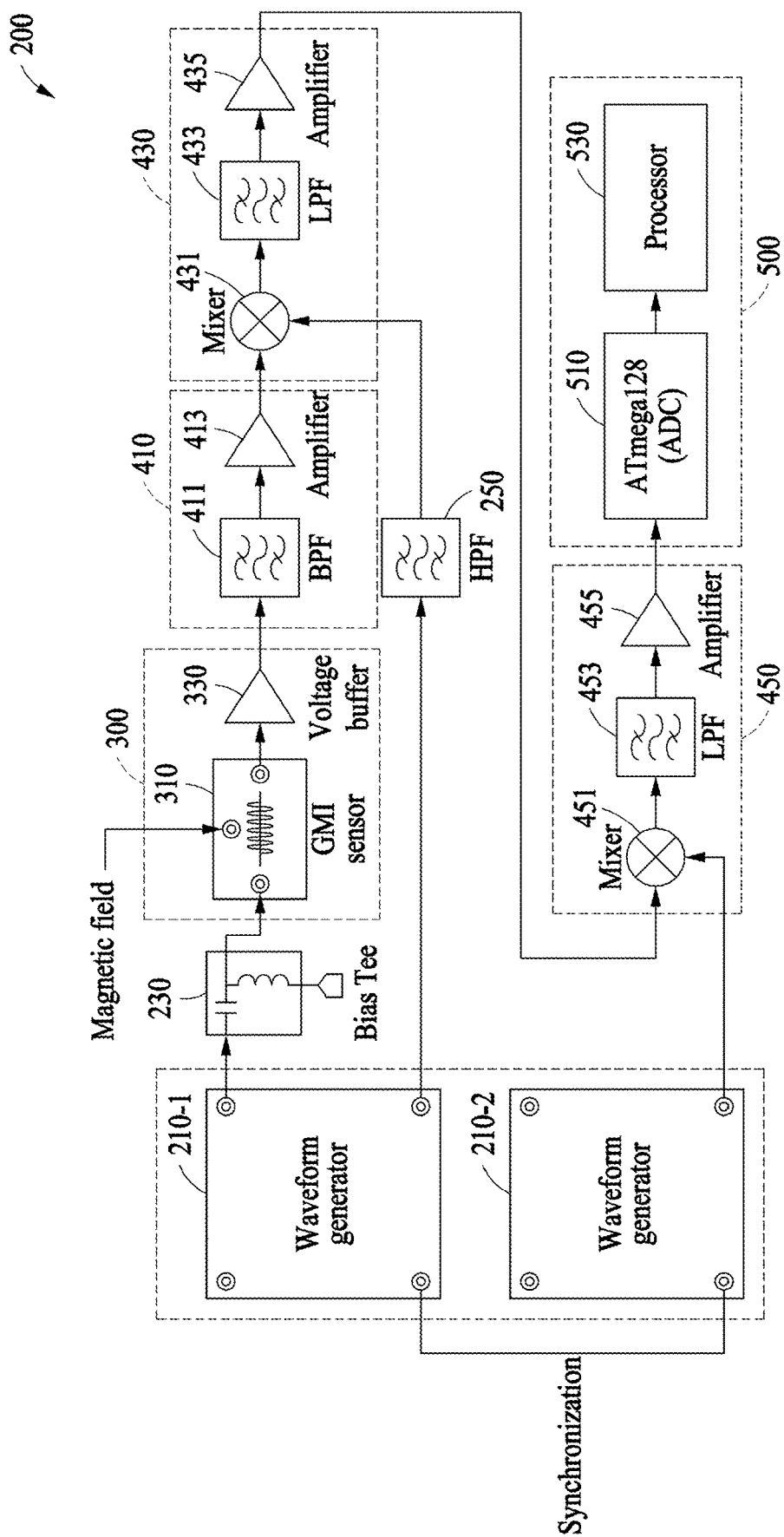
FIG. 2 is a diagram illustrating an example of the receiver illustrated in FIG. 1 according to an example embodiment.
Figure 3A:
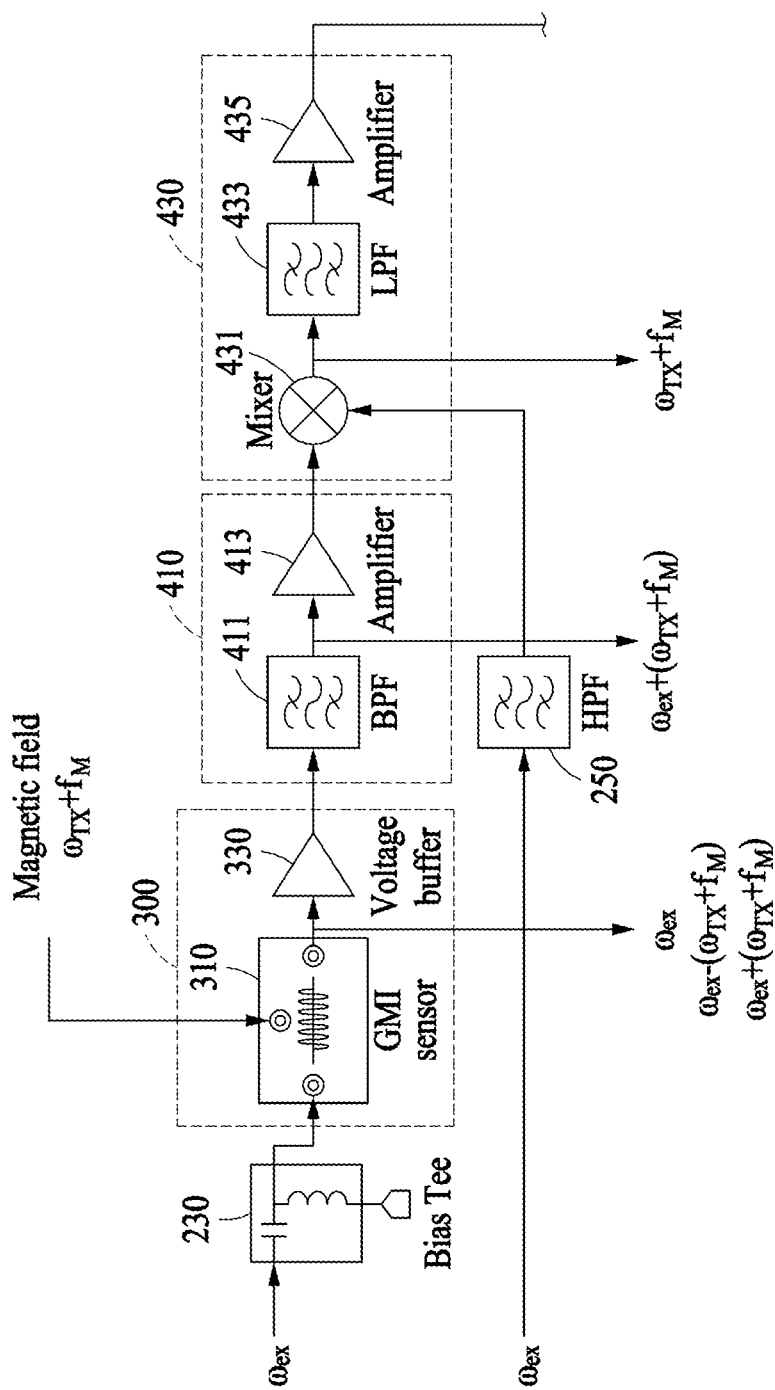
FIGS. 3A and 3B are diagrams illustrating examples of an operation of the receiver illustrated in FIG. 1 according to example embodiments.
Figure 3B:
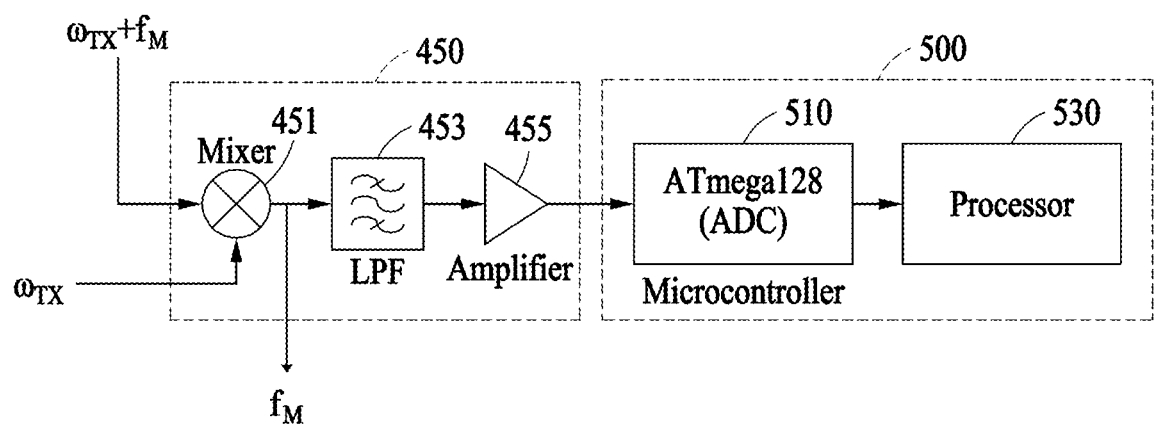

FIG. 2 is a diagram illustrating an example of the receiver 200 illustrated in FIG. 1, and FIGS. 3A and 3B are diagrams illustrating examples of an operation of the receiver 200 illustrated in FIG. 1.

The receiver 200 may include a signal generator 210, the GMI magnetometer 300, a first signal extractor 410, a second signal extractor 430, a third signal extractor 450, and the data acquisition device 500. The first signal extractor 410, the second signal extractor 430, and the third signal extractor 450 may correspond to the demodulator 400 illustrated in FIG. 1.

The signal generator 210 may provide a comparison signal to the GMI magnetometer 300, the second signal extractor 430, and the third signal extractor 450. The signal generator 210 may include an oscillator. The signal generator 210 may generate a signal based on a set frequency and/or a voltage condition. For example, the signal generator 210 may generate a sine wave, a square wave, an alternating current (AC) voltage signal, and/or a direct current (DC) bias signal.

The signal generator 210 may include a first signal generator 210-1 that transmits the comparison signal to the GMI magnetometer 300 and the second signal extractor 430 and a second signal generator 210-2 that transmits the comparison signal to the third signal extractor 450. The first signal generator 210-1 and the second signal generator 210-2 may perform synchronization to match clocks of oscillators included in each of the first signal generator 210-1 and the second signal generator 210-2.

The first signal generator 210-1 may apply a voltage signal that is set as a magnetization frequency $\omega_{ex}$ to the GMI magnetometer 300. The first signal generator 210-1 may apply a DC bias voltage along with an AC voltage to the GMI magnetometer 300. The first signal generator 210-1 may generate a DC bias signal to the GMI magnetometer 300 through a bias circuit 230.

The GMI magnetometer 300 may include a GMI sensor 310 and a voltage buffer 330. The GMI sensor 310 may detect a first communication signal based on a received modulation signal. The first communication signal may include a magnetization frequency signal $\omega_{ex}$ and a signal in which the magnetization frequency signal $\omega_{ex}$, a carrier wave frequency signal $\omega_{TX}$, and a message signal $f_M$ are combined. The signal in which the magnetization frequency signal $\omega_{ex}$, the carrier wave frequency signal $\omega_{TX}$, and the message signal $f_M$ are combined may be the magnetization frequency signal $\omega_{ex}\pm$(carrier frequency signal $\omega_{TX}$+message signal $f_M$).

The GMI magnetometer 300 may transmit the three detected signals to the first signal extractor 410. Here, the voltage buffer 330 may set an output end impedance of the GMI magnetometer 300 to be infinite to maximally transmit a signal to the first signal extractor 410. For example, an input end of the voltage buffer 330 may be connected to an output end of the GMI sensor 310, and an input end impedance of the voltage buffer 330 may be thousands of ohms (Ω) or more. An output end impedance of the voltage buffer 330 may be 50 ohms, which is suitable for the magnetic field communication system 10.

The first signal extractor 410 may extract the second communication signal $\omega_{ex}+(\omega_{TX}+f_M)$ including the message signal $f_M$ from the first communication signal. The first signal extractor 410 may include a band-pass filter 411 and an amplifier 413.

The band-pass filter 411 may extract a second communication signal $\omega_{ex}+(\omega_{TX}+f_M)$ including a message among first communication signals, and the second communication signal $\omega_{ex}+(\omega_{TX}+f_M)$ may be amplified through the amplifier 413.

The second signal extractor 430 may extract the third communication signal $\omega_{TX}+f_M$ by removing the magnetization frequency signal $\omega_{ex}$ from the second communication signal $\omega_{ex}+(\omega_{TX}+f_M)$. The second signal extractor 430 may include a mixer 431, a low-pass filter 433, and an amplifier 435.

The third communication signal $\omega_{TX}+f_M$ may be extracted when the second communication signal $\omega_{ex}+(\omega_{TX}+f_M)$ passes through the mixer 431 to which a local oscillator (LO) signal is generated from the first signal generator 210-1. In such case, the LO signal may have the same frequency as the magnetization frequency signal $\omega_{ex}$ and be applied to the mixer 431 through a high-pass filter 250.

When the third communication signal $\omega_{TX}+f_M$ passes through the low-pass filter 433, a harmonic component (noise) may be removed. The third communication signal $\omega_{TX}+f_M$ may be amplified through the amplifier 435.

The third signal extractor 450 may extract the message signal $f_M$ by removing the carrier wave frequency signal $\omega_{TX}$ from the third communication signal $\omega_{TX}+f_M$. The third signal extractor 450 may include a mixer 451, a low-pass filter 453, and an amplifier 455.

The message signal may be extracted when the third communication signal $\omega_{TX}+f_M$ passes through the mixer 451 to which an LO signal is generated from the second signal generator 210-2. In such case, the LO signal may have the same frequency as the carrier frequency signal $\omega_{TX}$.

When the message signal $f_M$ passes through the low-pass filter 453, a harmonic component (noise) may be removed. The message signal $f_M$ may be amplified through the amplifier 455.

Although FIGS. 2 and 3B illustrate the third signal extractor 450 including the mixer 451, a third signal extractor may be provided without including the mixer 451. The third signal extractor 450 may include an oscillator that generates an LO signal and a clock signal having the same frequency as the carrier wave frequency signal. The third signal extractor 450 may extract a message signal from a third communication signal based on the generated LO signal and the clock signal.

The data acquisition device 500 may convert the message signal $f_M$ into a digital signal and store the digital signal. The data acquisition device 500 may include an analog-to-digital converter (ADC) 510, a processor 530, and a memory (not shown). For example, the processor 530 and the memory (not shown) may be implemented in various devices that may process the digital signal.

The data acquisition device 500 may convert the message signal $f_M$ into the digital signal through the ADC 510. The data acquisition device 500 may collect the digital signal by searching for an inserted terminator for classifying the message signal $f_M$, correcting an error, and performing decoding. For example, the data acquisition device 500 may perform decoding with a Manchester code.

Figure 4:
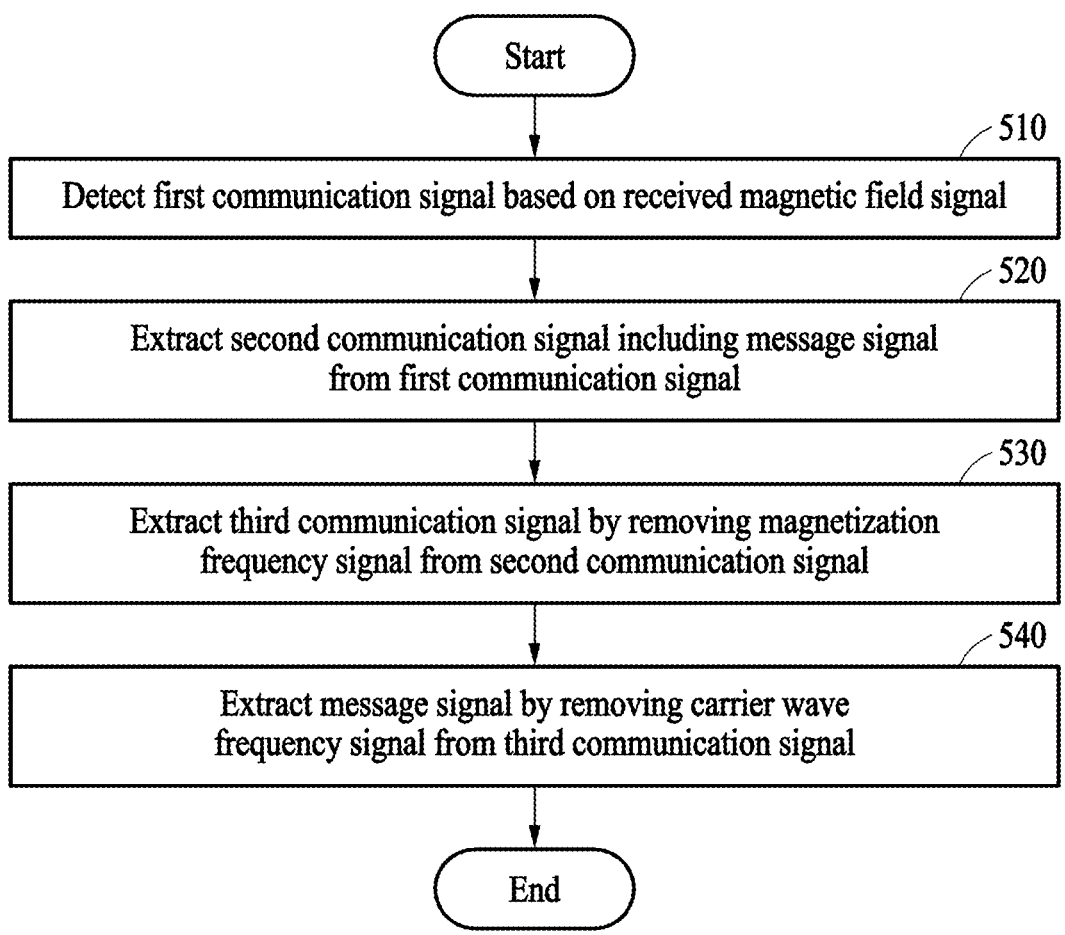
FIG. 4 is a diagram illustrating an example of a magnetic field communication method according to an example embodiment.

FIG. 4 is a diagram illustrating an example of a magnetic field communication method according to an example embodiment.

The magnetic field communication method may include operation 510 of detecting a first communication signal based on a received magnetic field signal. The first communication signal may include a magnetization frequency signal and a signal in which the magnetization frequency signal, a carrier wave frequency signal, and a message signal are combined.

The magnetic field communication method may include operation 520 of extracting a second communication signal including a message signal from the first communication signal. The second communication signal may be a signal obtained by adding the magnetization frequency signal, the carrier wave frequency signal, and the message signal.

The magnetic field communication method may include an operation 530 of extracting a third communication signal by removing the magnetization frequency signal from the second communication signal. The third communication signal may be a signal obtained by adding the carrier wave frequency signal and the message signal. The third communication signal may be extracted by removing the magnetization frequency signal using the LO signal having the same frequency as the magnetization frequency signal. The third communication signal may be amplified by removing a harmonic component.

The magnetic field communication method may include operation 540 of extracting the message signal by removing the carrier wave frequency signal from the third communication signal. The message signal may be extracted by removing the carrier frequency signal using the LO signal of the same frequency as the carrier wave frequency signal. The message signal may be amplified by removing a harmonic component.

The operations described above with reference to FIG. 4 may be applied to the operations performed by the receiver 200 (or the magnetic field communication apparatus 200) described with reference to FIGS. 1 through 3B. Thus, a more detailed description of the operations is not included here, for brevity.

The example embodiments described herein may be implemented using hardware components, software components, or a combination thereof. A processing device may be implemented using one or more general-purpose or special purpose computers, such as, for example, a processor, a controller and an arithmetic logic unit (ALU), a digital signal processor (DSP), a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A magnetic field communication apparatus, comprising:
   a giant magnetoimpedance (GMI) magnetometer configured to detect a first communication signal based on a received magnetic field signal;
   a first signal extractor configured to extract a second communication signal comprising a message signal from the first communication signal;
   a second signal extractor configured to extract a third communication signal by removing a magnetization frequency signal from the second communication signal; and
   a third signal extractor configured to extract the message signal by removing a carrier wave frequency signal from the third communication signal.

2. The magnetic field communication apparatus of claim 1, wherein the first communication signal comprises:
   the magnetization frequency signal and a signal in which the magnetization frequency signal, the carrier wave frequency signal, and the message signal are combined.

3. The magnetic field communication apparatus of claim 1, wherein the second signal extractor comprises:
   a mixer configured to remove the magnetization frequency signal using a local oscillator (LO) signal having a same frequency as the magnetization frequency signal.

4. The magnetic field communication apparatus of claim 3, wherein the second signal extractor further comprises:
   a low-pass filter configured to remove a harmonic component of the third communication signal; and
   an amplifier configured to amplify the third communication signal.

5. The magnetic field communication apparatus of claim 1, wherein the third signal extractor comprises:
   a mixer configured to remove the carrier wave frequency signal using an LO signal having a same frequency as the carrier wave frequency signal.

6. The magnetic field communication apparatus of claim 5, wherein the third signal extractor further comprises:
a low-pass filter configured to remove a harmonic component of the message signal; and
an amplifier configured to amplify the message signal.

7. The magnetic field communication apparatus of claim 1, further comprising:
a signal generator configured to provide a comparison signal among at least one of the GMI magnetometer, the second signal extractor, and the third signal extractor.

8. The magnetic field communication apparatus of claim 1, further comprising:
a data acquisition device configured to convert the message signal into a digital signal and collect the digital signal.

9. A magnetic field communication system, comprising:
a transmission device configured to emit a magnetic field signal modulated by a message signal; and
the magnetic field communication apparatus of claim 1.

10. The magnetic field communication system of claim 9, wherein the magnetic field signal is a signal modulated by inserting a terminator for classifying the message signal.

11. A magnetic field communication method, comprising:
detecting a first communication signal based on a received magnetic field signal;
extracting a second communication signal comprising a message signal from the first communication signal;
extracting a third communication signal by removing a magnetization frequency signal from the second communication signal; and
extracting the message signal by removing a carrier wave frequency signal from the third communication signal.

12. The magnetic field communication method of claim 11, wherein the first communication signal comprises:
the magnetization frequency signal and a signal in which the magnetization frequency signal, the carrier wave frequency signal, and the message signal are combined.

13. The magnetic field communication method of claim 11, wherein the extracting of the third communication signal comprises:
removing the magnetization frequency signal using a local oscillator (LO) signal having a same frequency as the magnetization frequency signal.

14. The magnetic field communication method of claim 13, wherein the extracting of the third communication signal further comprises:
removing a harmonic component of the third communication signal; and
amplifying the third communication signal.

15. The magnetic field communication method of claim 11, wherein the extracting of the message signal comprises:
removing the carrier wave frequency signal using an LO signal having a same frequency as the carrier wave frequency signal.

16. The magnetic field communication method of claim 15, wherein the extracting of the message signal further comprises:
removing a harmonic component of the message signal; and
amplifying the message signal.

17. The magnetic field communication method of claim 11, further comprising:
converting the message signal into a digital signal; and
collecting the digital signal.

* * * * *